(12) United States Patent
Kozaki

(10) Patent No.: US 8,705,149 B2
(45) Date of Patent: Apr. 22, 2014

(54) IMAGE READING APPARATUS

(71) Applicant: Daisuke Kozaki, Kiyosu (JP)

(72) Inventor: Daisuke Kozaki, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/015,366

(22) Filed: Aug. 30, 2013

(65) Prior Publication Data

US 2014/0002870 A1  Jan. 2, 2014

Related U.S. Application Data

(63) Continuation of application No. 12/889,906, filed on Sep. 24, 2010, now Pat. No. 8,526,080.

(30) Foreign Application Priority Data

Dec. 25, 2009 (JP) ................................. 2009-294366

(51) Int. Cl.
*H04N 1/04* (2006.01)
*G03G 15/00* (2006.01)

(52) U.S. Cl.
USPC ........... 358/497; 358/474; 358/471; 399/379; 399/380

(58) Field of Classification Search
USPC ......... 358/474, 471, 488, 400, 401, 497, 494, 358/500, 501, 505; 399/379, 380, 211, 212; 250/239, 234–236; 235/454
See application file for complete search history.

(56) References Cited

U.S. PATENT DOCUMENTS

| 4,072,418 | A | 2/1978 | Fujizuka |
| 6,408,162 | B1 | 6/2002 | Sheng et al. |
| 6,608,989 | B2 | 8/2003 | Anderson et al. |
| 6,766,126 | B2 | 7/2004 | Hsu et al. |
| 6,877,660 | B2 | 4/2005 | Wang et al. |
| 6,882,822 | B2 * | 4/2005 | Gomi et al. .................. 399/380 |
| 6,990,311 | B2 | 1/2006 | Pyle et al. |
| 7,822,377 | B2 | 10/2010 | Liu |
| 8,199,374 | B2 | 6/2012 | Ko et al. |
| 8,265,540 | B2 | 9/2012 | Harada |

FOREIGN PATENT DOCUMENTS

JP  S60-159428 U  10/1985
(Continued)

OTHER PUBLICATIONS

JP Reasons for Rejection dated Oct. 25, 2011, corresponding Application No. 2009-294366; English Translation.

*Primary Examiner* — Cheukfan Lee
(74) *Attorney, Agent, or Firm* — Banner & Witcoff, Ltd.

(57) ABSTRACT

An image reading apparatus configured to reduce a force required for moving a document cover to an open position is provided. The image reading apparatus includes a document table having a top surface and a reading area and a document cover that is configured to pivot, around an axis extending in a first direction, between a closed position and an open position. The document cover includes a sheet. The top surface has a marginal area which is located outside of a reading area on a side opposite to the axis. The marginal area includes a contact area and a non-contact area which are arranged in the first direction. When the document cover is in the closed position, the top surface in the contact area contacts the sheet, and the top surface in the non-contact area does not contact the sheet.

18 Claims, 12 Drawing Sheets

(56) References Cited

FOREIGN PATENT DOCUMENTS

| | | |
|---|---|---|
| JP | S61-000142 U1 | 1/1986 |
| JP | S62-55637 A | 3/1987 |
| JP | S63-133136 A | 6/1988 |
| JP | S64-15729 A | 1/1989 |
| JP | H05-53214 A | 3/1993 |
| JP | 2006-140951 A | 6/2006 |
| JP | 2008-151932 A | 7/2008 |

* cited by examiner

IMAGE READING APPARATUS

CROSS REFERENCE TO RELATED APPLICATION

This application is a continuation of prior U.S. application Ser. No. 12/889,906, filed Sep. 24, 2010, which claims priority from Japanese Patent Application No. 2009-294366, filed on Dec. 25, 2009, which are incorporated herein by reference.

FIELD

Aspects of the disclosure relate to an image reading apparatus including a document table on which a document is placed to be read, and a document cover including a sheet to contact the document table.

BACKGROUND

Multifunction apparatuses, copiers, scanners, and other image forming apparatuses include an image reading apparatus that is configured to read an image of a document. As such an image reading apparatus, a flatbed scanner is known. The image reading apparatus includes a document table, an image reader, and a document cover. A document is placed on the document table, and the document cover is closed over the document, and the image reader reads an image of the document.

The document cover is configured to block extraneous light such that the effect of light on image reading is eliminated and to press the document against the document table, whereby the precision with which to read an image is improved.

SUMMARY

In a known image reading apparatus, the image reader is disposed under the document table and configured to read an image of a document, and the document cover is pivotally supported at one side of the document table and configured to press and fix the document against the document table when the document cover is closed.

The document cover includes a sheet, which is disposed on a surface of the document cover facing the document table when the document cover is closed. The sheet has a flat surface which contacts the document and a surface of the document table when the document cover is closed.

When the image reading apparatus is not used, the document cover is closed in most cases. While the sheet contacts the surface of the document table, an adhesion force of the sheet acts on the surface of the document table. In a case where the sheet is kept in contact with the surface of the document table for a long time, the adhesion force increases and the sheet clings to the surface of the document table like a suction cup. Thus, when the user raises the document cover, a force equivalent to the increased adhesion force is required.

Aspects of the disclosure provide an image reading apparatus including an image reader, which is configured to read an image of a document placed on a document table, and a document cover including a sheet, which is configured to contact the document table, wherein the image reading apparatus is configured to reduce a force required for moving the document cover to an open position.

BRIEF DESCRIPTION OF THE DRAWINGS

Illustrative aspects will be described in detail with reference to the following figures in which like elements are labeled with like numbers and in which.

DETAILED DESCRIPTION

Figure 1:
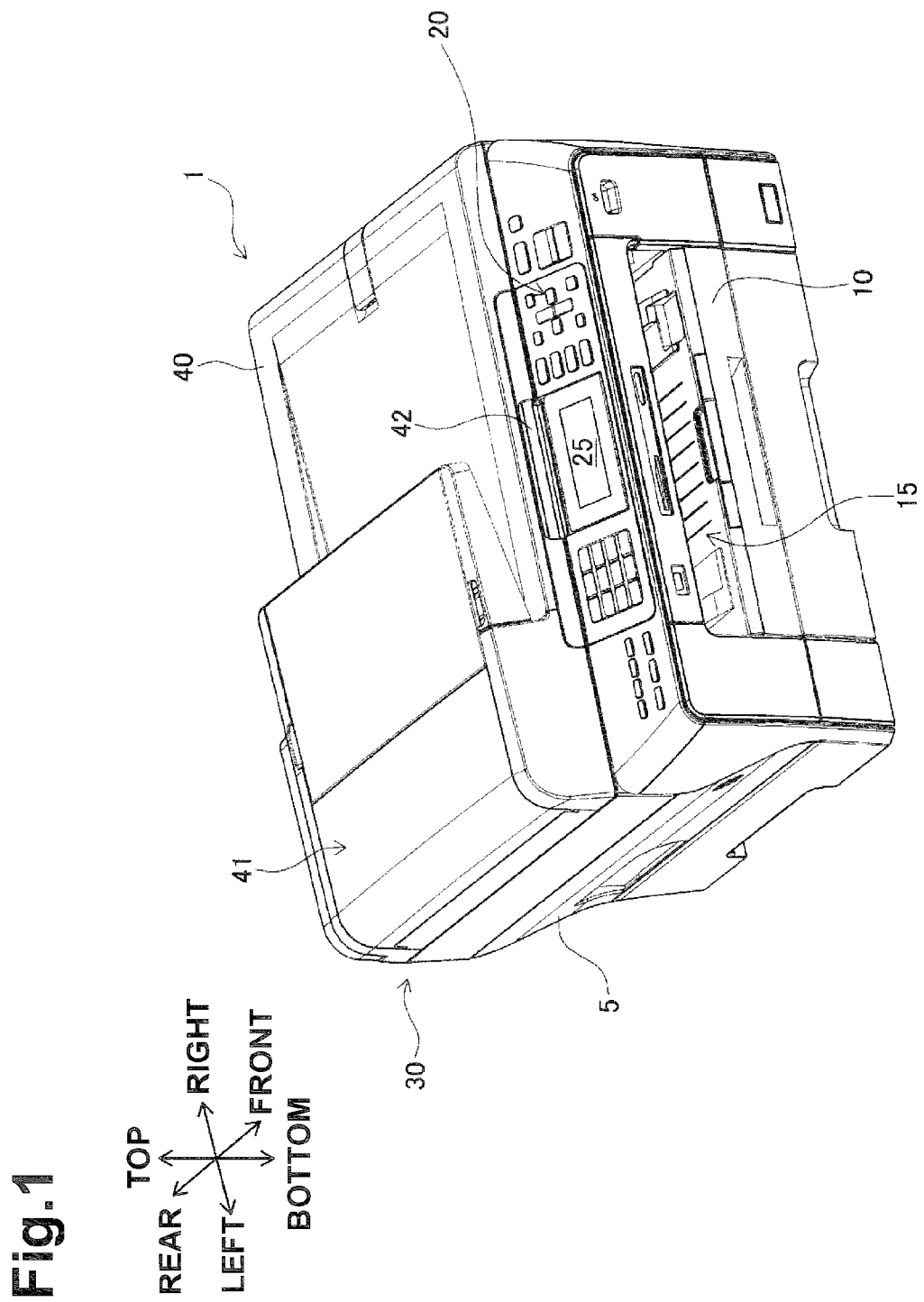
FIG. 1 is a perspective view of a multifunction apparatus according to illustrative aspects of the disclosure.

The general structure of an illustrative multifunction apparatus 1 as an example of an image reading apparatus according to illustrative aspects of the disclosure will be described with reference to FIG. 1.

For ease of discussion, in the following description, the top or upper side, the bottom or lower side, the left or left side, the right or right side, the front or front side, and the rear or rear side are used to define the various parts when the multifunction apparatus 1 is disposed in an orientation in which it is intended to be used.

A first embodiment will be described.

The multifunction apparatus 1 according to the first embodiment is provided with printing function, copying function, and facsimile function as well as a function as an image reading apparatus or scanning function. As shown in FIGS. 1 and 2, the multifunction apparatus 1 includes a main body casing 5. The main body casing 5 accommodates a printer unit (not shown) performing a printing function and copying function, and a facsimile unit (not shown) performing a facsimile function. The multifunction apparatus 1 includes a scanner unit 30 functioning as an image reading apparatus in an upper portion of the main body casing 5.

The multifunction apparatus 1 includes a sheet supply cassette 10 in a lower portion of the main body casing 5. The sheet supply cassette 10 is configured to store recording sheets in a stack, which are to be printed in the printing and copying functions by the printer unit. The sheet supply cassette 10 is configured to be attached to and removed from the main body casing 5 by sliding in the front-rear direction of the multifunction apparatus 1. The multifunction apparatus 1 includes a sheet ejection portion 15 above the sheet cassette 10. The sheet ejection portion 15 is configured to accumulate recording sheets printed in printing or copying function.

The multifunction apparatus 1 includes an operation panel 20 on a front top side of the main body casing 5. The operation panel 20 has a display 25 and operation buttons. The display 25 is a liquid crystal display which displays various messages related to the functions of the multifunction apparatus 1. The operation buttons are used when a user provides instructions to the multifunction apparatus 1.

The structure of the scanner unit 30 according to the embodiment will be described with reference to the drawings. As described above, the multifunction apparatus 1 includes the scanner unit 30 in the upper portion of the main body casing 5. The scanner unit 30 is a flatbed image scanner, and includes a document cover 40 and a document table 50.

Figure 2:
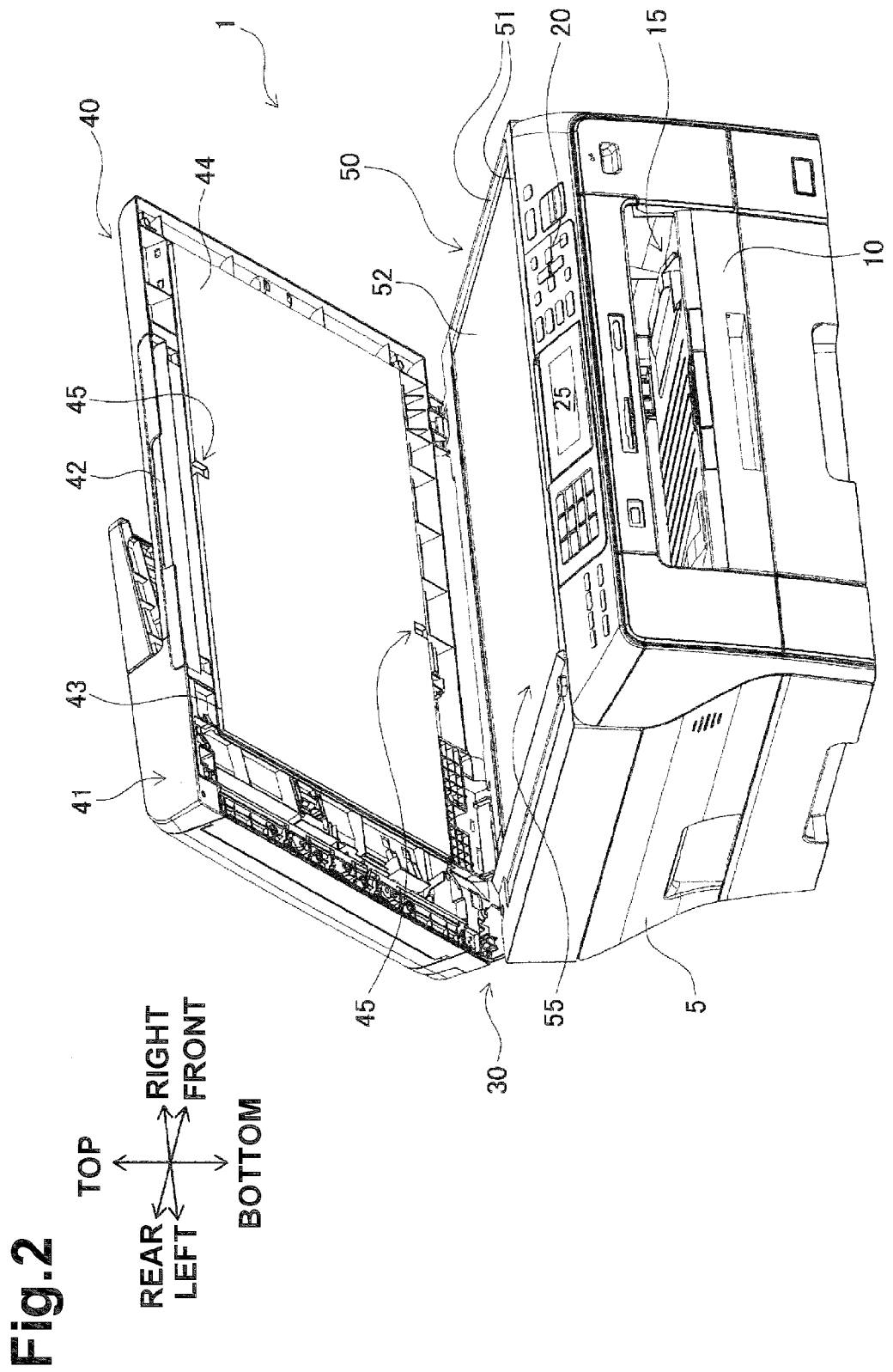
FIG. 2 is a perspective view of the multifunction apparatus in which a document cover is open.

As shown in FIGS. 1 and 2, the document cover 40 is supported to pivot around an axis on a rear end of a top surface of the main body casing 5. In this embodiment, the document cover 40 is configured to move, e.g. pivot at the rear side in this embodiment, between a closed position (FIG. 1) in which the document cover 40 covers a top surface of the document table 50 and an open position (FIG. 2) in which the front side of the document cover 40 is placed upward and the top surface of the document base 50 is exposed.

The document cover 40 has an automatic document feeder 41, a finger recess portion 42, a cushion 43, and a sheet 44. The automatic document feeder 41 is disposed on the left end of the top of the document cover 40, and is configured to feed a document to be read along a predetermined path. As the structure of the automatic document feeder 41 is already known, the detailed description thereof is omitted.

Figure 3:
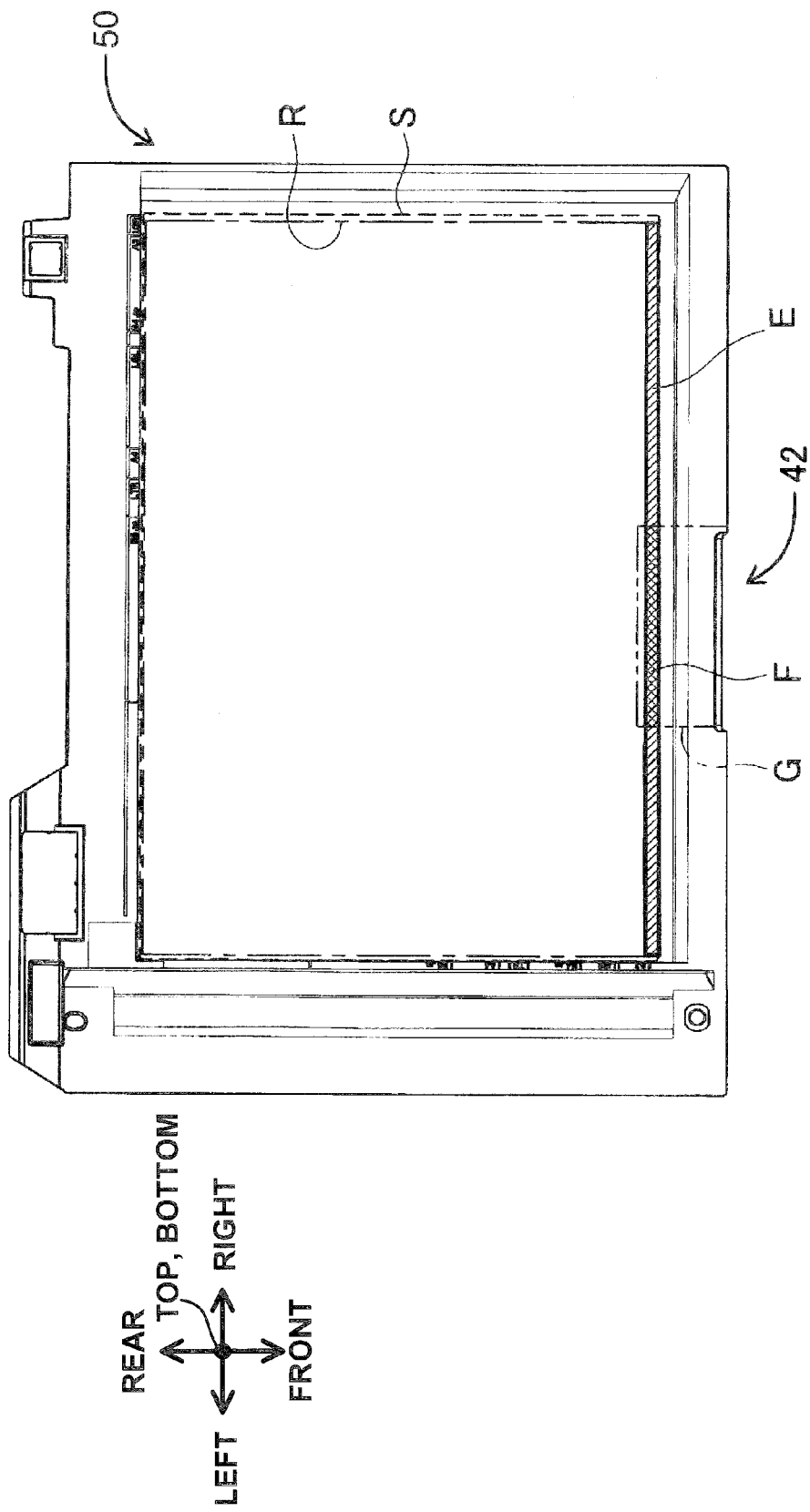
FIG. 3 is a top view of a document table illustrating positional relationship among a reading area, a sheet equivalent area, and a finger recess portion equivalent area.

The finger recess portion 42 is a handle portion, which is designed to be held by the user when the document cover 40 is moved from the closed position to the open position. Thus, when the document cover 40 is moved to the open position, a force applied by the user acts in proximity to the finger recess portion 42. The finger recess portion 42 is formed in a central portion of the front end of the document cover 40, and extends with a constant width in the left-right direction. An area where the force applied to the finger recess portion 42 by the user operation acts effectively is referred to as a finger recess portion equivalent area G (FIG. 3). The finger recess portion equivalent area G corresponds to the length of the finger recess portion 42 in the left-right direction.

The cushion 43 is a flat sponge made of a synthetic resin, and is disposed on the lower surface of the document cover 40 when the document cover 40 is placed in the closed position. Thus, the cushion 43 faces toward the top surface of the document table 50 when the document cover 40 is placed in the closed position. The cushion 43 is formed in a rectangle slightly greater than an area in which the scanner unit 30 is capable of reading an image (hereinafter this area is referred to as a reading area R shown in FIG. 3).

The sheet 44 is a film made of polypropylene or polyester, and is disposed on the lower surface of the cushion 43 when the document cover 40 is placed in the closed position. Thus, when the document cover 40 is placed in the closed position, the sheet 44 contacts the top surface of the document table 50 at least in the reading area R. Similarly to the cushion 43, the sheet 44 is formed in a rectangle slightly greater than the reading area R. When the document cover 40 is in the closed position, an area of the top surface of the document table 50 in which the sheet 44 occupies is referred to as a sheet equivalent area S.

The cushion 43 and the sheet 44 are formed with pressure reducing portions 45. The pressure reducing portions 45 are formed by manufacturing, for example, cutting out predetermined portions of the cushion 43 and the sheet 44. The pressure reducing portions 45 are configured to reduce burden on the user when moving or raising the document cover 40 to the open position.

The document table 50 is disposed at the top of the main body casing 5, is a place on which a document to be read by the scanner unit 30 is placed, and constitutes the principal part of the scanning function. The document table 50 includes a frame 51, a flatbed glass 52, and a scanner unit 55.

The flatbed glass 52 is a sheet of transparent material, such as a glass or plastic, and constitutes the top surface of the document table 50. A document to be read by the scanner unit 30 is placed on the flatbed glass 52. The frame 51 is disposed along the edges of the flatbed glass 52 to hold the flatbed glass 52 therein. The frame 51 also contains the top surface of the document table 50, as well as the flatbed glass 52.

Figure 4:
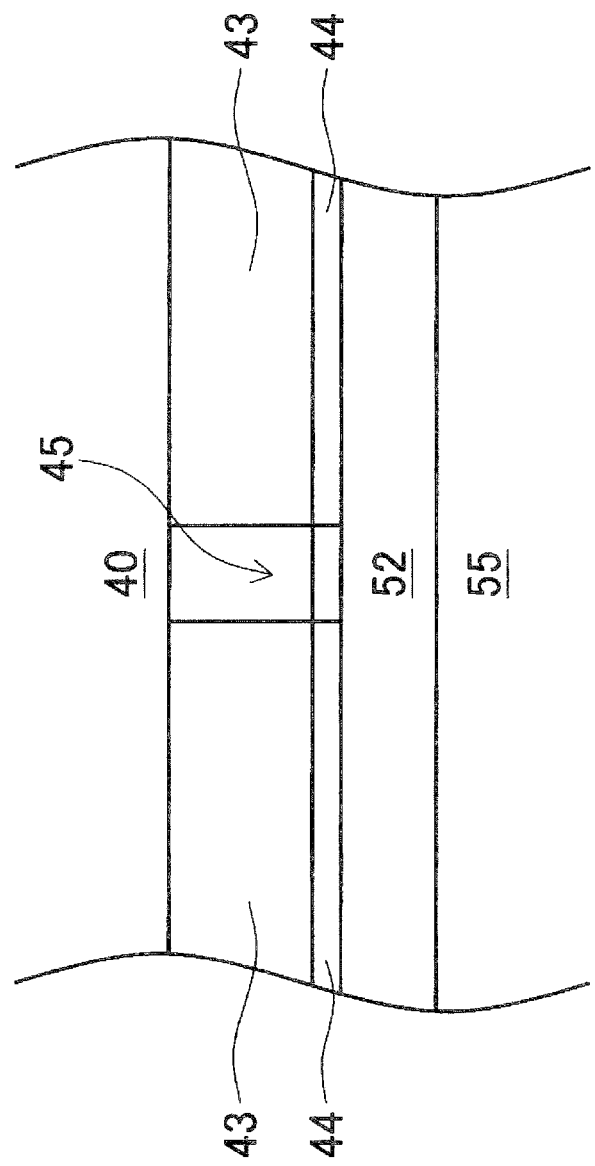
FIG. 4 is a cross sectional view illustrating parts in proximity to a pressure reducing portion according to a first embodiment.

The scanner unit 55 has an image sensor, e.g., a contact image sensor (CIS), and constitutes the principal part of the scanner unit 30. The scanner unit 55 is disposed under the flatbed glass 52 as shown in FIGS. 2 and 4, and is configured to move in the left-right direction (in a sub scanning direction) in an area corresponding to the reading area R. Thus, the scanner unit 55 is configured to read an image of a document placed in the reading area R on the flatbed glass 52.

To read an image of a document placed on the document table 50 in the multifunction apparatus 1, the user places the document on the flatbed glass 52 for image reading, and moves or lowers the document cover 40 to the closed position. As the document cover 40 is closed, the document on the flatbed glass 52 is pressed against the flatbed glass 52 by the cushion 43 and the sheet 44 of the document cover 40, and fixed in place. In this situation, the multifunction apparatus 1 controls the scanner unit 55 to obtain a good reading result.

When the scanning function is not used in the multifunction apparatus 1, it is necessary to place the document cover 40 in the closed position. When the document cover 40 is closed, the sheet 44 comes proximate to the flatbed glass 52 with a slight distance away from the flatbed glass 52. At this time, the slight distance forms a space, which is almost hermetically sealed, between the sheet 44 and the flatbed glass 52. Air in the space between the sheet 44 and the flatbed glass 52 is likely to leak outside the space due to the weight of the document cover 40 and the atmospheric pressure applied to the document cover 40. As a result, as the pressure in the space gets lower than the atmospheric pressure, the document cover 40 may cling to the flatbed glass 52 of the document table 50 via the sheet 44 like a suction cup as shown in FIG. 4.

A structure of the pressure reducing portions 45 according to the first embodiment will be described with reference to FIGS. 3-6. As described above, the pressure reducing portions 45 are formed by cutting out predetermined portions of the cushion 43 and the sheet 44.

As shown in FIG. 3, the top surface of the document table 50 includes a marginal area E, which is outside of the reading area R on a side where the finger recess portion 42 is formed, e.g. on the front side in this embodiment. The marginal area E extends in the left-right direction. In the marginal area E, the scanner unit 30 does not read an image. The marginal area E includes a formation area F, which is an overlapping area where the sheet equivalent area S overlaps the finger recess portion equivalent area G. The pressure reducing portions 45 are formed at ends of the cushion 43 and the sheet 44 to be located within the formation area F. As the pressure reducing portions 45 are formed at the ends of the cushion 43 and the sheet 44 to be located within the formation area F, they are located outside of the reading area R. Thus, the pressure reducing portions 45 are not contained in the result of an image to be read by the scanner unit 30. In other words, the multifunction apparatus 1 can read an image of a document without influence from the pressure reducing portions 45. In addition, as the pressure reducing portions 45 are located within the finger recess portion equivalent area G, the force applied to the finger recess portion 42 by the user effectively acts on the pressure reducing portions 45.

Figure 5:
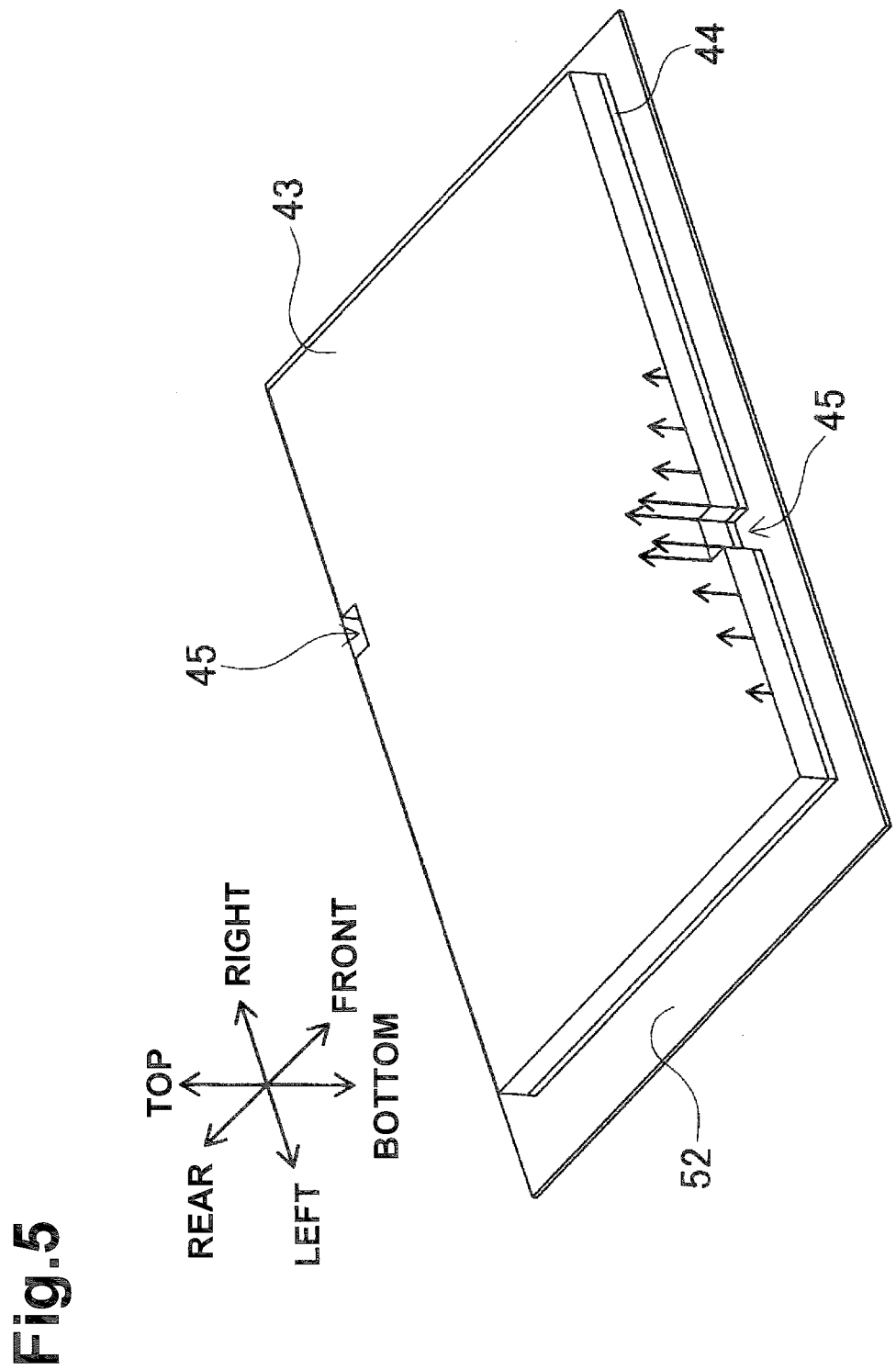
FIG. 5 illustrates force to be applied to the pressure reducing portion when the document cover is opened.

The pressure reducing portions 45 are formed by cutting out the ends of the cushion 43 and the sheet 44, which are to be located within the formation area F, to a predetermined dimension. Thus, as shown in FIGS. 2 and 5, the pressure reducing portions 45 are cutouts which are recessed inward from the ends of the cushion 43 and the sheet 44. The sheet 44 at the pressure reducing portion 45 does not contact the flatbed glass 52.

As shown in FIG. 5, as the pressure reducing portions 45 are recessed inward from the ends of the cushion 43 and the sheet 44, the force applied to the finger recess portion 42 by the user can be exerted in proximity to the pressure reducing portions 45 intensively. Thus, when the document cover 40 clings to the flatbed glass 52 like a suction cup, the user can easily separate the sheet 44 from the flatbed glass 52 in proximity to the pressure reducing portions 45. Once a part of the sheet 44 is separated from the flatbed glass 52, air enters between the sheet 44 and the flatbed glass 52, so that the sheet 44 can be easily separated from the flatbed glass 52. In this manner, the multifunction apparatus 1 can reduce the burden on the user when moving the document cover 40 to the open position.

Figure 6:
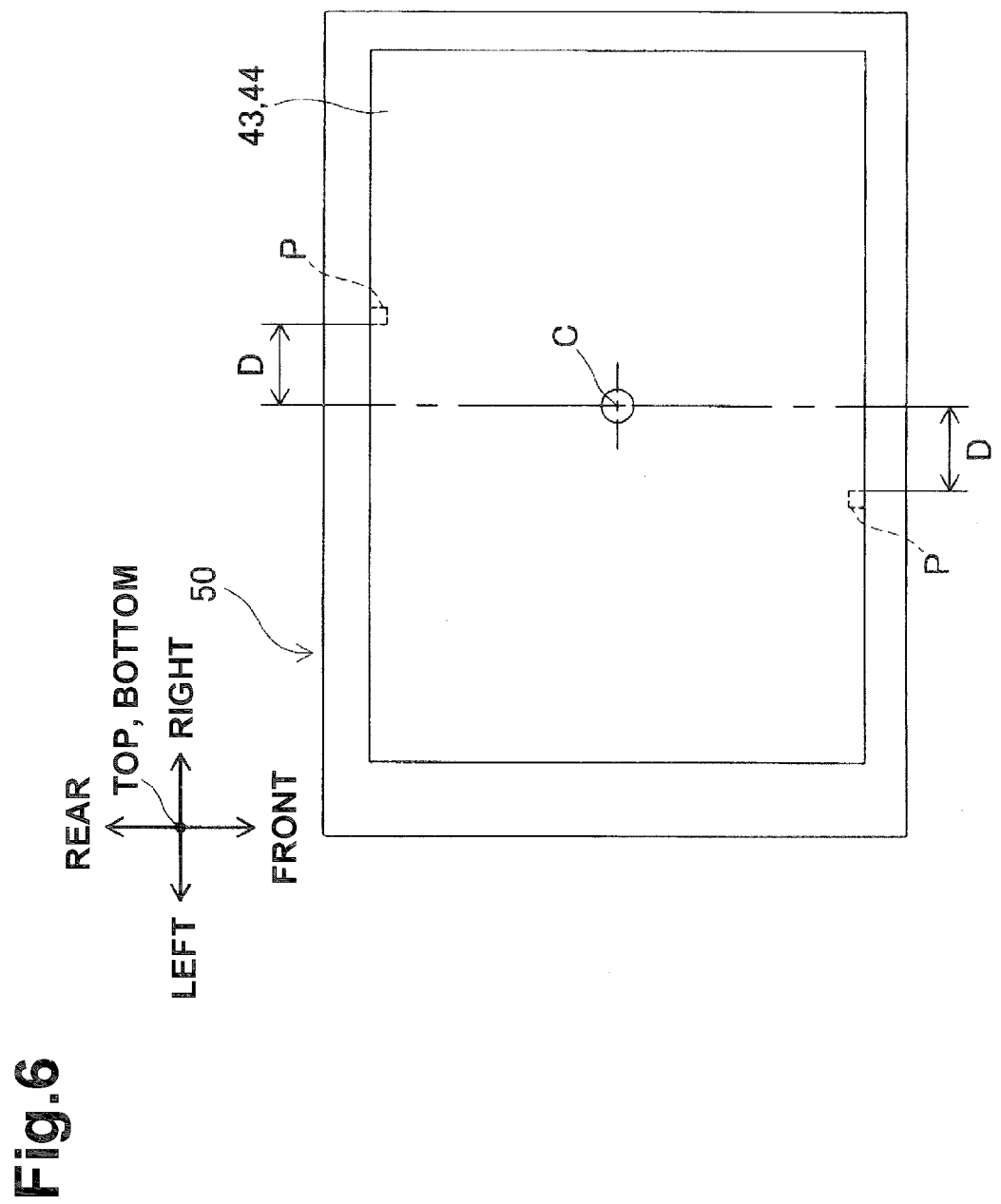
FIG. 6 illustrates positions where the pressure reducing portions are formed.

As shown in FIG. 6, the pressure reducing portions 45 are formed in two positions P which are located at the front and rear ends of each of the cushion 43 and the sheet 44. In the following description, the cushion 43 and the sheet 44 are collectively referred to as the sheet 44 because they have the same size. One position P located at the front end of the sheet 44 is eccentric a distance D from a center C of the sheet 44 in a predetermined direction, e.g. rightward in FIG. 6. The other position P located at the rear end of the sheet 44 is eccentric the distance D from the center C of the sheet 44 in a predetermined direction, e.g. leftward in FIG. 6. That is, the position P at the rear end of the sheet 44 and the position P at the front end of the sheet 44 are symmetrical about the center C of the sheet 44.

Thus, the cushion 43 and the sheet 44 have the pressure reducing portions 45 in two positions P which are symmetrical about the center C. Thus, if the cushion 43 and the sheet 44 are rotated 180 degrees about the center C, the positional relationship between the pressure reducing portions 45 are unchanged. In other words, when the multifunction apparatus 1 is manufactured, a worker can attach the cushion 43 and the sheet 44 to the document cover 40 without consideration of the orientation of the cushion 43 and the sheet 44. As a result, the burden on the worker for attaching the cushion 43 and the sheet 44 to the document cover 40 can be reduced.

Each position P is determined to be located within the formation area F. Thus, when the document cover 40 is placed in the closed position, the sheet 44 contacts the flatbed 52 except for the pressure reducing portion 45 in the formation area F. In other words, the formation area F includes a contact area where the flatbed glass 52 contacts the sheet 44 and a non-contact area where the flatbed glass 52 doe not contact the sheet 44. In the marginal area E, the left and right areas of the formation area F are the contact areas.

As described above, the multifunction apparatus 1 according to the first embodiment includes the scanner unit 30, and the scanner unit 30 includes the document table 50, the scanner unit 55, and the document cover 40. The scanner unit 30 is used when the document cover 40 is in the closed position such that the scanner unit 55 reads an image of a document placed on the document table 50. The document cover 40 includes the finger recess portion 42, the cushion 43, and the sheet 44. When the document cover 40 is in the closed position, the sheet 44 faces the flatbed glass 52 which is the top surface of the document table 50. The cushion 43 and the sheet 44 include the pressure reducing portions 45 in the position P located within the formation area F, which facilitate releasing the sheet 44 from dinginess between the sheet 44 and the flatbed glass 52. Thus, in the multifunction apparatus 1, the document cover 40 can be easily raised to the open position.

In the multifunction apparatus 1, the formation area F in which the pressure reducing portion 45 is formed falls within the finger recess portion equivalent area G, which is located in proximity to the finger recess portion 42. When the finger recess portion 42 is used to move the document cover 40 to the open position, the force applied by the user appropriately acts on the pressure reducing portion 45. As a result, the multifunction apparatus 1 can make efficient use of the force applied by the user when the document cover 40 is moved to the open position, facilitating the operation for moving the document cover 40 to the open position. The formation area F is located outside of the reading area R when the document cover 40 is in the closed position. Thus, the pressure reducing portion 45 does not exert an influence upon an image to be read by the scanner unit 55.

The pressure reducing portions 45 are formed with a simple working operation, e.g., by cutting out the ends of the cushion 43 and the sheet 44 so as to be located in the position P within the formation area F. Thus, the pressure reducing portions 45 allow a force, which is applied by the user in the operation for moving the document cover 40 to the open position, to be exerted intensively on the pressure reducing portions 45 (FIG. 5). Even when the document cover 40 clings to the top surface of the document table 50, the multifunction apparatus 1 can take in air between the sheet 44 and the flatbed glass 52 through the pressure reducing portion 45 such that the pressure between the sheet 44 and the flatbed glass 52 becomes equal to the atmospheric pressure. Thus, even when the document cover 40 clings to the document table 50 like a suction cup, the multifunction apparatus 1 can facilitate the operation for moving the document cover 40 to the open position.

The pressure reducing portions 45 are formed in two positions P, which are symmetrical with respect to the center C of the sheet 44. Once the center C is set in place, the worker can attach the sheet 44 to the document cover 40 without consideration of the orientation of the sheet 44. As a result, the multifunction apparatus 1 can reduce the burden on the worker for attaching the cushion 43 and the sheet 44 to the document cover 40.

A second embodiment will be described with reference to FIGS. 7 and 8.

It is noted that the multifunction apparatus 1 according to the second embodiment is identical in basic structure to that of the first embodiment, except for the structure of the pressure reducing portions 45. In FIGS. 7 and 8, a pressure reducing portion 45A is a variant of the pressure reducing portion 45 of the first embodiment, where parts substantially equivalent to those described above are denoted by the same reference numerals, and descriptions thereof will be omitted.

Figure 7:
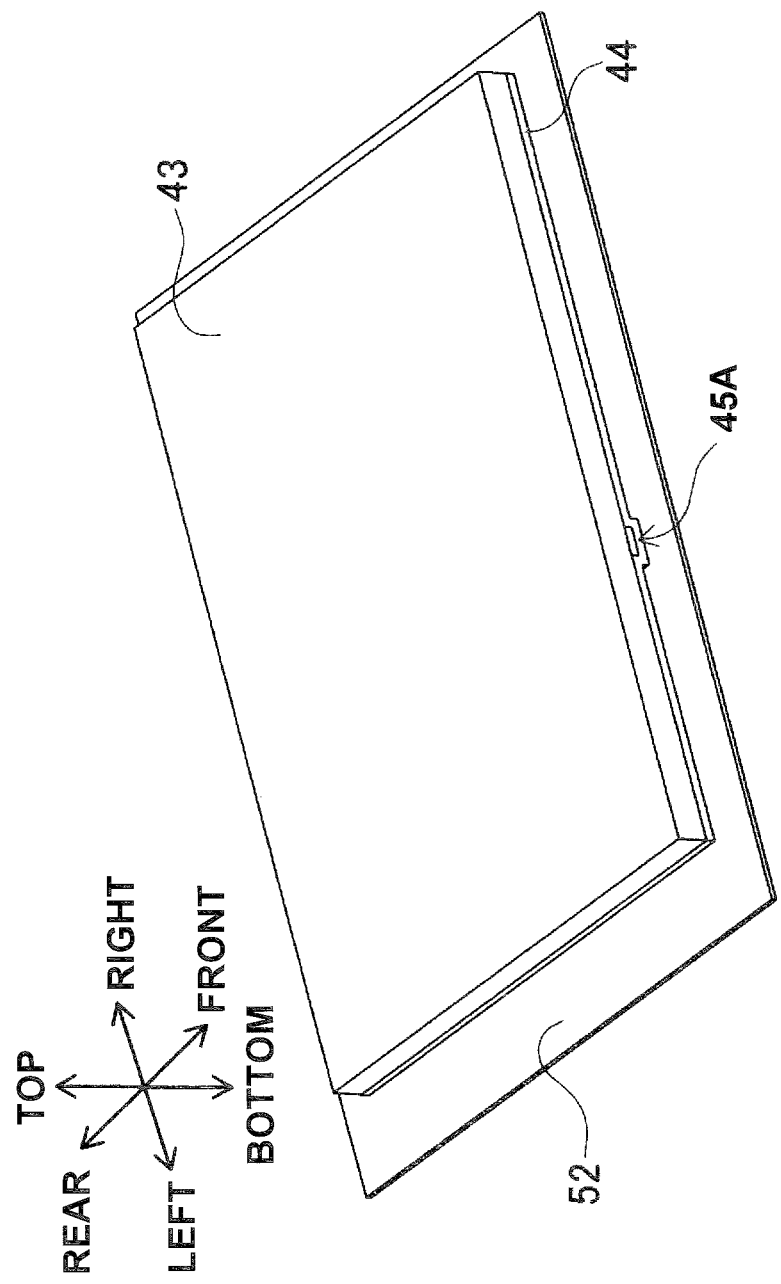
FIG. 7 illustrates a pressure reducing portion according to a second embodiment.
Figure 8:
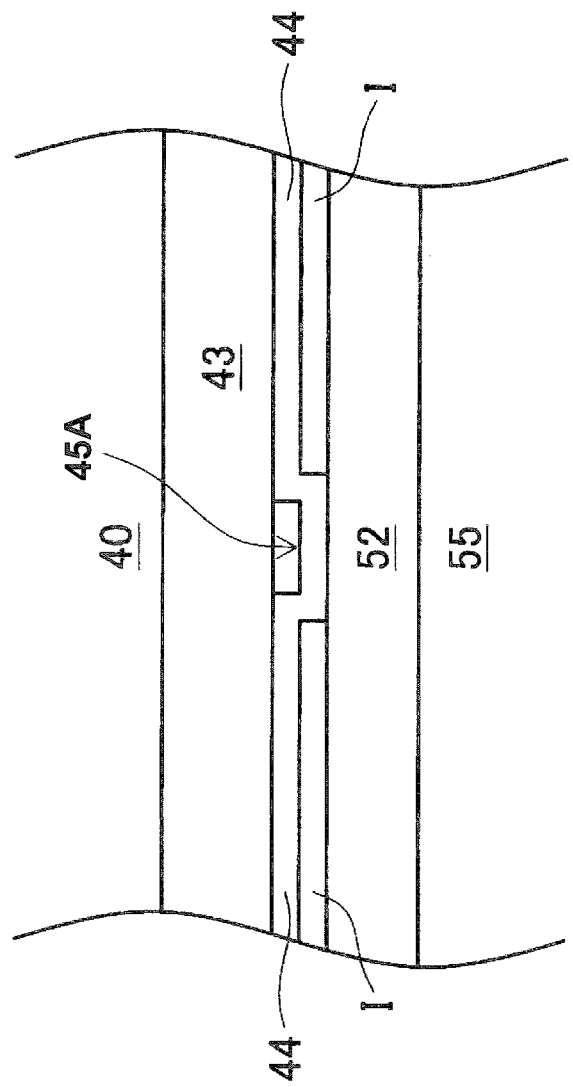
FIG. 8 is a cross sectional view illustrating parts in proximity to the pressure reducing portion according to the second embodiment.

As shown in FIG. 7, the pressure reducing portion 45A is formed such that it protrudes downward by a predetermined dimension at the position P. That is, the pressure reducing portion 45A is a downward protrusion in which the sheet 44 protrudes toward the document cover 40 to be located in the position P. Thus, in the multifunction apparatus 1 according to the second embodiment, when the document cover 40 is in the closed position, only a part of the sheet 44 corresponding to the pressure reducing portion 45A contacts the flatbed glass 52. In other words, the most part of the sheet 44 is located above the flatbed glass 52 via a space I, which is formed between the sheet 44 and the flatbed glass 52, as shown in FIG. 8. When the sheet 44 is viewed only in the formation area F of the document table 50, the sheet 44 at the pressure reducing portion 45A, which is a downward protrusion, corresponds to the contact area, and the sheet 44 above the space I corresponds to the non-contact area. In the marginal area E, the left and right areas of the formation area F may be the non-contact areas and also may be the contact areas.

Even when the document cover 40 is in the closed position, the space I is in fluid communication with outside air such as to take in outside air. Thus, as the pressure in the space I becomes equal to the atmospheric pressure, the pressure reducing portion 45A can reduce a chance of the sheet 44 clinging to the flatbed glass 52 like a suction cup.

The pressure reducing portions 45A are formed in the positions P (FIG. 6) located at the front and rear ends of the sheet 44 similarly to the first embodiment. In other words, the pressure reducing portions 45A are formed in the positions P which are symmetrical with respect to the center C of the sheet 44. Thus, the multifunction apparatus 1 according to the second embodiment can also reduce the burden on the worker for attaching the sheet 44 to the document cover 40.

The pressure reducing portion 45A formed at the front end of the sheet 44 is located in the position P within the formation area F, similarly to the first embodiment. In the second embodiment as well, when the document cover 40 is in the closed position, the pressure reducing portion 45A is located outside of the reading area R. Thus, the pressure reducing portion 45A does not exert an influence upon an image read by the scanner unit 55. As the position P at the front end of the sheet 44 falls within the finger recess portion equivalent area G, the force applied to the finger recess portion 42 by the user can be effectively exerted on the pressure reducing portion 45A at the front end of the sheet 44. As a result, the multifunction apparatus 1 according to the second embodiment can facilitate the operation for moving the document cover 40 to the open position.

In the multifunction apparatus 1 according to the second embodiment, the sheet 44 has the pressure reducing portion 45A in the position P within the formation area F, which reduces the dinginess between the sheet 44 and the flatbed glass 52, similarly to the first embodiment. Thus, the multifunction apparatus 1 can facilitate the operation for moving the document cover 40 to the open position. In addition, as the formation area F falls within the finger recess portion equivalent area G, when the finger recess portion 42 is used to move the document cover 40 to the open position, the force applied by the user appropriately acts on the pressure reducing portion 45A. As a result, the multifunction apparatus 1 of the second embodiment can make efficient use of the force applied by the user when the document cover 40 is moved to the open position, thereby facilitating the operation for moving the document cover 40 to the open position. The formation area F is located outside of the reading area R when the document cover 40 is in the closed position. Thus, the pressure reducing portion 45A does not exert an influence upon an image read by the scanner unit 55 in the second embodiment as well.

The pressure reducing portions 45A are formed by simple working, e.g., protruding the end of the sheet 44 downward in a state when the document cover 40 is in the closed position. The pressure reducing portion 45A forms the space I, which is in communication with outside air, between the sheet 44 and the flatbed glass 52 when the document cover 40 is in the closed position. Thus, the multifunction apparatus 1 according to the second embodiment can facilitate the operation for moving the document cover 40 to the open position.

In the second embodiment as well, the pressure reducing portions 45A are formed in the two positions P, which are symmetrical with respect to the center C of the sheet 44. The multifunction apparatus 1 according to the second embodiment can reduce the burden on the worker for attaching the sheet 44 to the document cover 40.

A third embodiment will be described with reference to FIGS. 9 and 10.

It is noted that the multifunction apparatus 1 according to the third embodiment is identical in basic structure to that of the first embodiment, except for the structure of the pressure reducing portions 45. In FIGS. 9 and 10, a pressure reducing portion 45B is a variant of the pressure reducing portion 45 of the first embodiment, where parts substantially equivalent to those described above are denoted by the same reference numerals, and descriptions thereof will be omitted.

Figure 9:
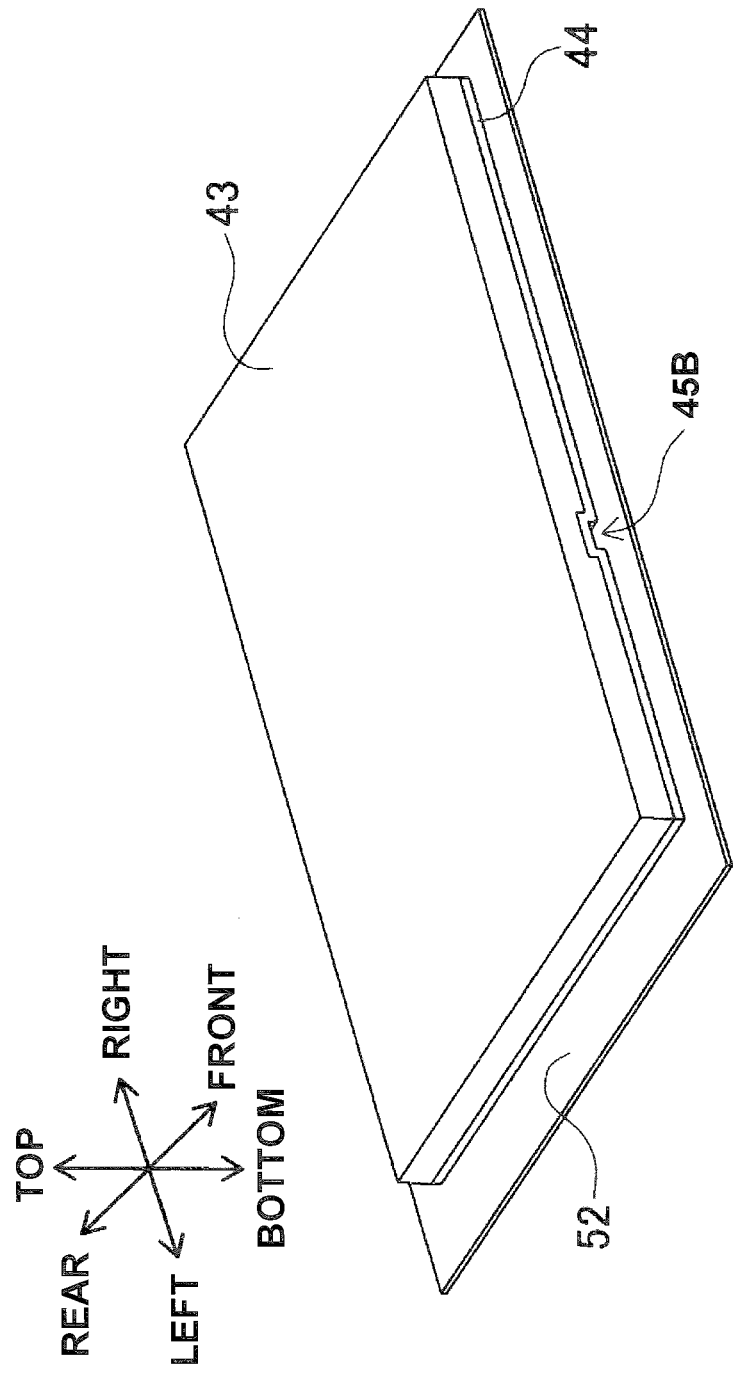
FIG. 9 illustrates a pressure reducing portion according to a third embodiment.
Figure 10:
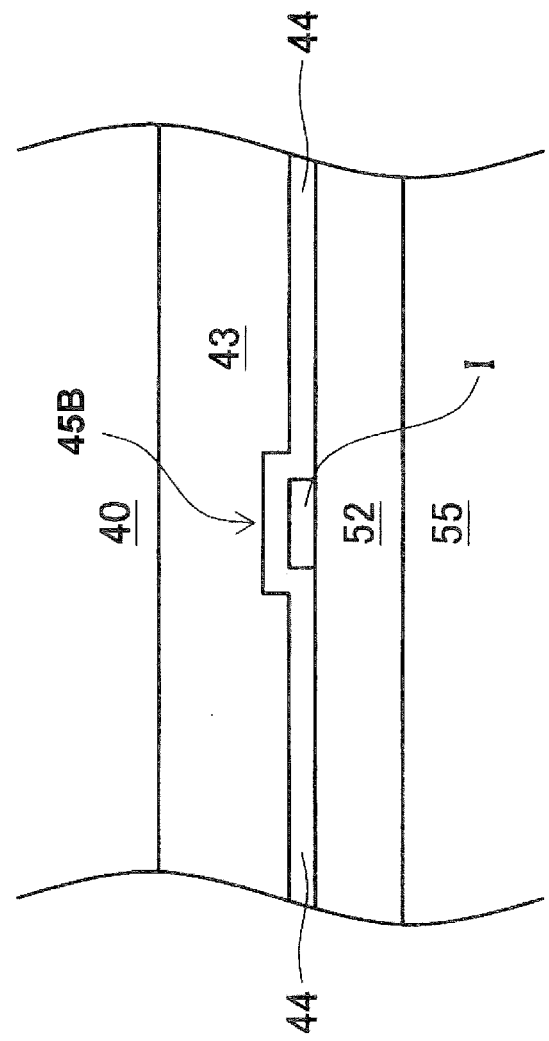
FIG. 10 is a cross sectional view illustrating parts in proximity to the pressure reducing portion according to the third embodiment.

As shown in FIG. 9, the pressure reducing portion 45B is formed by recessing the end of the sheet 44, which is located in the position P within the formation area F, upward by a predetermined dimension. That is, the pressure reducing portion 45B is an upward recess in which the sheet 44 is recessed toward the document cover 40 to be located in the position P. In the multifunction apparatus 1 according to the third embodiment, when the document cover 40 is in the closed position, the sheet 44 at the pressure reducing portion 45B is spaced a predetermined distance above the flatbed glass 52. The sheet 44 at the pressure reducing portion 45B is located above the flatbed glass 52 via a space I, which is formed between the sheet 44 and the flatbed glass 52 at the pressure reducing portion 45B, as shown in FIG. 10. When the sheet 44 is viewed only in the formation area F of the document table 50, the sheet 44 at the pressure reducing portion 45B, which is an upward recess, corresponds to the non-contact area, and the sheet 44 except for the pressure reducing portion 45B corresponds to the contact area. In the marginal area E, the left and right areas of the formation area F are the contact areas.

Thus, the pressure reducing portion 45B allows air to pass, via the space I, between the sheet 44 and the flatbed glass 52. In other words, even when the document cover 40 located in the closed position clings to the flatbed glass 52 like a suction cap, the pressure reducing portion 45B passes air between the sheet 44 and the flatbed glass 52 in accordance with the operation for moving the document cover 40 to the open position, such that the pressure between the sheet 44 and the flatbed glass 52 becomes equal to the atmospheric pressure. As a result, the multifunction apparatus 1 according to the third embodiment can provide the user with a situation in which the user can easily position the document cover 40 in the open position.

The pressure reducing portions 45B are formed in the positions P (FIG. 6) located at the front and rear ends of the sheet 44 similarly to the first embodiment. In other words, the pressure reducing portions 45B are formed in the positions P which are symmetrical with respect to the center C of the sheet 44. Thus, the multifunction apparatus 1 according to the third embodiment can also reduce the burden on the worker for attaching the sheet 44 to the document cover 40.

The pressure reducing portion 45B formed at the front end of the sheet 44 is located in the position P within the formation area F, similarly to the first embodiment. In the third embodiment as well, when the document cover 40 is in the closed position, the pressure reducing portion 45B is located outside of the reading area R. Thus, the pressure reducing portion 45B does not exert an influence upon an image read by the scanner unit 55. As the position P at the front end of the sheet 44 falls within the finger recess portion equivalent area G, the force applied to the finger recess portion 42 by the user can be exerted on the pressure reducing portion 45B at the front end of the sheet 44 (refer to FIG. 5). As a result, the multifunction apparatus 1 according to the third embodiment can facilitate the operation for moving the document cover 40 to the open position.

As described above, in the multifunction apparatus 1 according to the third embodiment, the sheet 44 has the pressure reducing portion 45B in the position P within the formation area F, which reduces the dinginess between the sheet 44 and the flatbed glass 52, similarly to the first embodiment. Thus, the multifunction apparatus 1 can facilitate the operation for moving the document cover 40 to the open position. In addition, as the formation area F falls within the finger recess portion equivalent area G, when the finger recess portion 42 is used to move the document cover 40 to the open position, the force applied by the user appropriately acts on the pressure reducing portion 45B. As a result, the multifunction apparatus 1 of the third embodiment can make efficient use of the force applied by the user when the document cover 40 is moved to the open position, thereby facilitating the operation for moving the document cover 40 to the open position. The formation area F is located outside of the reading area R when the document cover 40 is in the closed position. Thus, the pressure reducing portion 45B does not exert an influence upon an image read by the scanner unit 55 in the second embodiment as well.

The pressure reducing portions 45B according to the third embodiment are formed by simple working, e.g., recessing the end of the sheet 44 upward in a state when the document cover 40 is in the closed position. Even when the document cover 40 located in the closed position clings to the flatbed glass 52 lick a suction cap, the pressure reducing portion 45B passes air between the sheet 44 and the flatbed glass 52 via the space I in accordance with the operation for moving the document cover 40 to the open position. Thus, the multifunction apparatus 1 according to the third embodiment can facilitate the operation for moving the document cover 40 to the open position.

In the third embodiment as well, the pressure reducing portions 45B are formed in the two positions P which are symmetrical with respect to the center C of the sheet 44. Thus, the multifunction apparatus 1 according to the third embodiment can also reduce the burden on the worker for attaching the sheet 44 to the document cover 40.

A fourth embodiment will be described with reference to FIGS. 11 and 12.

It is noted that the multifunction apparatus 1 according to the fourth embodiment is identical in basic structure to that of the first embodiment, except for the structure of the pressure reducing portions 45. In FIGS. 11 and 12, a pressure reducing portion 45C is a variant of the pressure reducing portion 45 of the first embodiment, where parts substantially equivalent to those described above are denoted by the same reference numerals, and descriptions thereof will be omitted.

Figure 11:
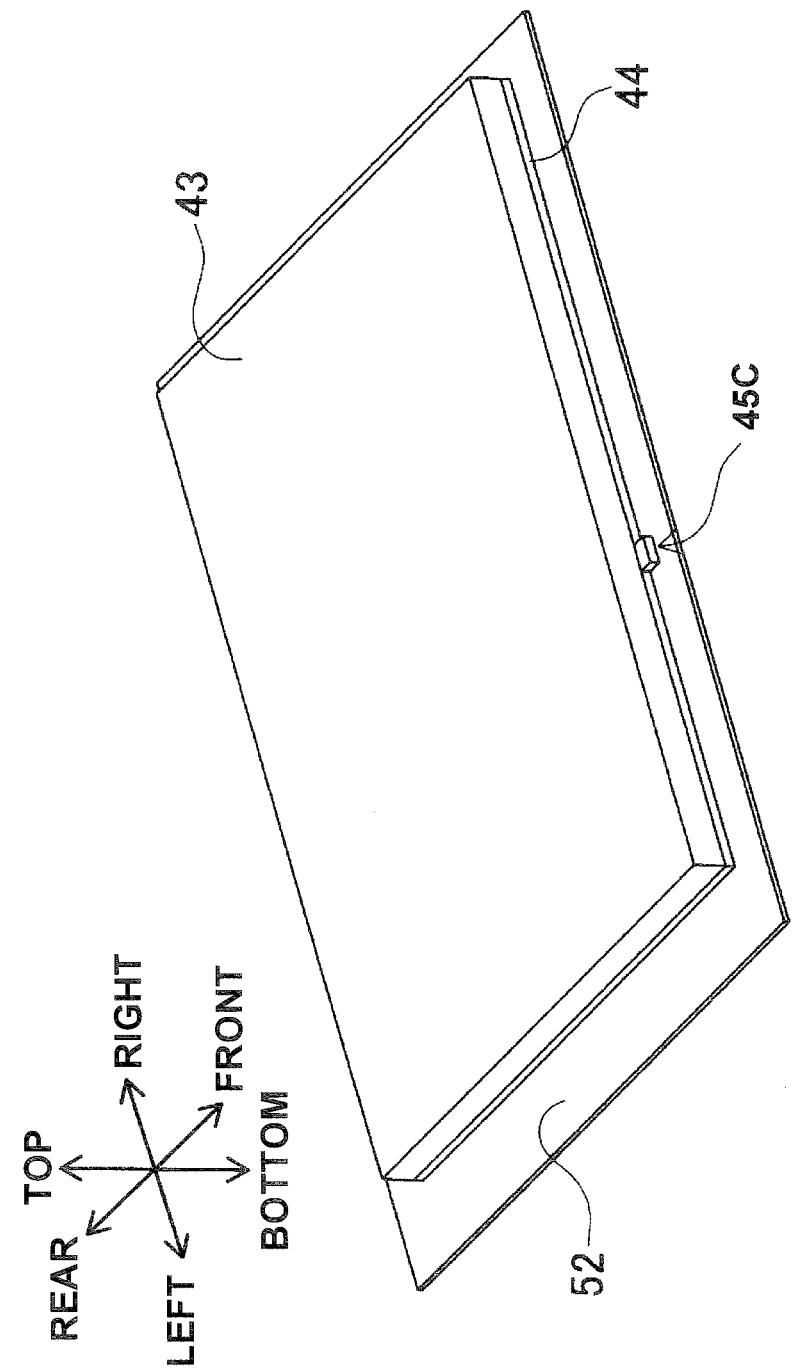
FIG. 11 illustrates a pressure reducing portion according to a fourth embodiment.
Figure 12:
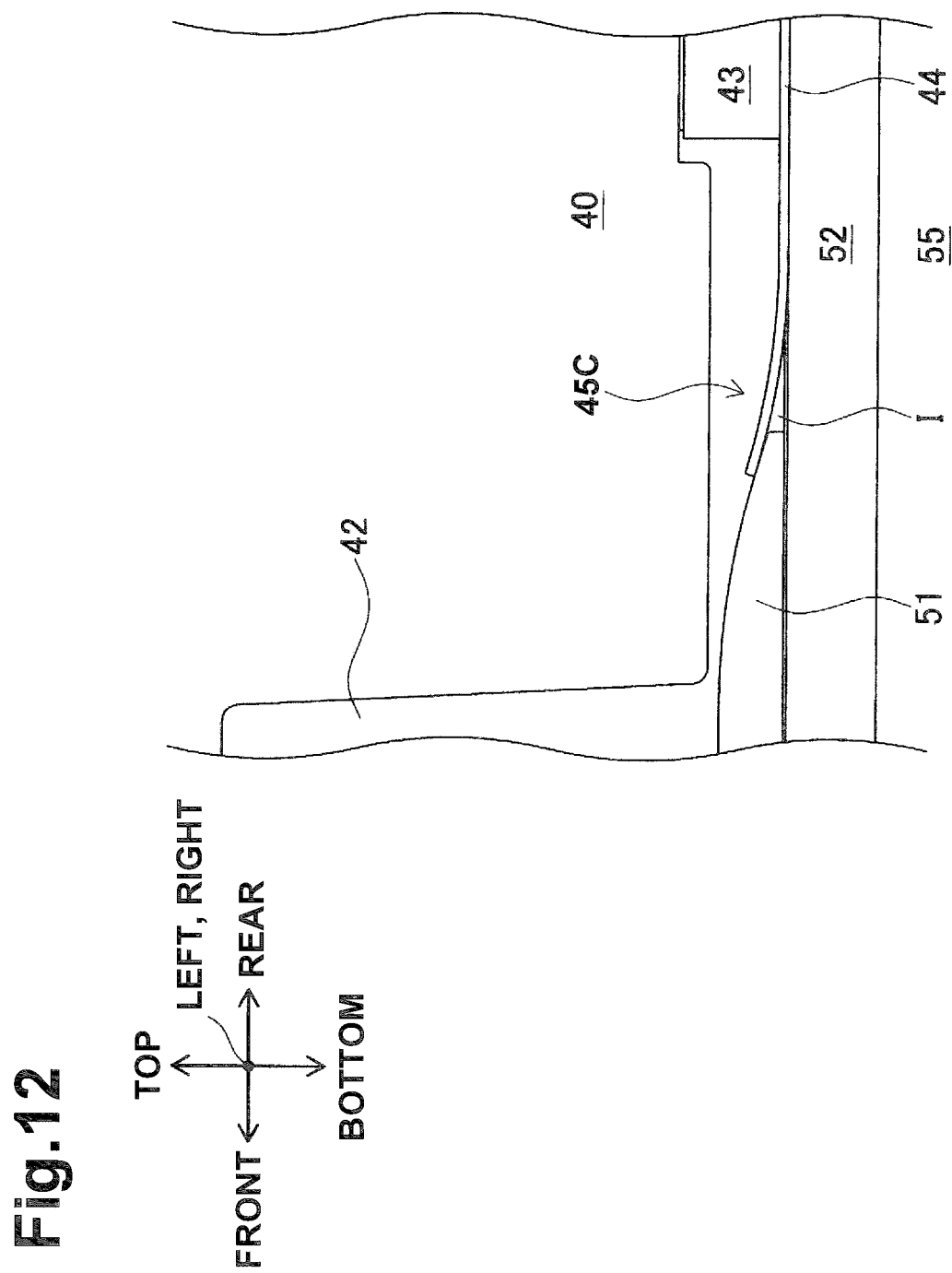
FIG. 12 is a cross sectional view illustrating parts in proximity to the pressure reducing portion according to the fourth embodiment.

As shown in FIG. 11, the pressure reducing portion 45C is formed by extending a part of the end of the sheet 44, which is located in the position P within the formation area F, outward, e.g. frontward in this embodiment, by a predetermined dimension. That is, the pressure reducing portion 45C is an extension where the sheet 44 partially sticks out to be located in the position P. When the document cover 40 is in the closed position, the sheet 44 contacts the frame 51 from above at the pressure reducing portion 45C. The frame 51 holds the flatbed glass 52 in such a manner as to cover the ends of the flatbed glass 52 on the top surface thereof. Thus, in the multifunction apparatus 1 according to the fourth embodiment, when the document cover 40 is in the closed position, a space I is formed in proximity to, e.g., below, the pressure reducing portion 45C. The space I is defined by the bottom surface of the sheet 44 having the pressure reducing portion 45C, the top surface of the flat bed glass 52, and the top surface of the frame 51 and is in communication with outside in the left and right direction (refer to FIGS. 11 and 12). When the sheet 44 is viewed only in the formation area F of the document table 50, the sheet 44 at the pressure reducing portion 45C, which is an extension, corresponds to the contact area, and the sheet 44 except for the pressure reducing portion 45C corresponds to the non-contact area. In the marginal area E, the left and right areas of the formation area F are the non-contact areas.

The pressure reducing portion 45C allows air to pass between the sheet 44 and the flatbed glass 52 via the space I in accordance with the operation for moving the document cover 40 to the open position. In other words, even when the document cover 40 located in the closed position clings to the flatbed glass 52 like a suction cap, the pressure reducing portion 45C passes air between the sheet 44 and the flatbed glass 52 in accordance with the operation for moving the document cover 40 to the open position, such that the pressure between the sheet 44 and the flatbed glass 52 becomes equal to the atmospheric pressure. As a result, the multifunction apparatus 1 according to the fourth embodiment can provide the user with a situation in which the user can easily position the document cover 40 in the open position.

The pressure reducing portion 45C is formed in the position P within the formation area F, similarly to the first embodiment. In other words, in the fourth embodiment as well, when the document cover 40 is in the closed position, the pressure reducing portion 45C is located outside of the reading area R. As a result, the pressure reducing portion 45C does not exert an influence upon an image read by the scanner unit 55. As the position P of the pressure reducing portion 45C is located in the finger recess portion equivalent area G, the force applied to the finger recess portion 42 by the user the pressure reducing portion 45C can be effectively exerted on the pressure reducing portion 45C. As a result, the multifunction apparatus 1 according to the fourth embodiment can facilitate the operation for moving the document cover 40 to the open position.

As described above, in the multifunction apparatus 1 according to the fourth embodiment, the sheet 44 has the pressure reducing portion 45C in the position P within the formation area F, which easily releases the dinginess between the sheet 44 and the flatbed glass 52, similarly to the first embodiment. Thus, the multifunction apparatus 1 can facilitate the operation for moving the document cover 40 to the open position. In addition, as the formation area F falls within the finger recess portion equivalent area G, when the finger recess portion 42 is used to move the document cover 40 to the open position, the force applied by the user appropriately acts on the pressure reducing portion 45C. As a result, the multifunction apparatus 1 of the fourth embodiment can make efficient use of the force applied by the user when the document cover 40 is moved to the open position, thereby facilitating the operation for moving the document cover 40 to the open position. The formation area F is located outside of the reading area R when the document cover 40 is in the closed position. Thus, the pressure reducing portion 45C does not exert an influence upon an image read by the scanner unit 55 in the second embodiment as well.

The pressure reducing portions 45C are formed by simple working, e.g., extending the end of the sheet 44 frontward in a state when the document cover 40 is in the closed position. When the document cover 40 located in the closed position clings to the flatbed glass 52 like a suction cap, the pressure reducing portion 45C passes air between the sheet 44 and the flatbed glass 52 via the space I in accordance with the operation for moving the document cover 40 to the open position. Thus, the multifunction apparatus 1 according to the fourth embodiment can facilitate the operation for moving the document cover 40 to the open position.

The illustrative embodiments show, but the disclosure is not limited to, the multifunction apparatus 1. Instead, an image scanner may be used.

The illustrative embodiments show, but the disclosure is not limited to, the document cover 40 having the automatic document feeder 41.

The first embodiment shows, but the disclosure is not limited to, the pressure reducing portions 45 formed in the cushion 43 and the sheet 44 in the positions P by cutting. The pressure reducing portions 45 may be formed in the sheet 44 only. The pressure reducing portions 45 in the cushion 43 may not be essential.

The second and third embodiments show, but the disclosure is not limited to, the pressure reducing portions 45A, 45B formed by shaping downward protrusions or upward recesses at the ends of sheet 44 located in the positions P. The pressure reducing portions 45A, 45B may be formed in any way. For example, the downward recesses may be formed in the sheet 44 by increasing the depth in surface texturing. Alternatively, the upward recesses may be formed in the sheet 44 by affixing a film having a predetermined thickness.

The illustrative embodiments show, but the disclosure is not limited to, that the pressure reducing portion 45, 45A, 45B or 45C is formed within the formation area F. The pressure reducing portion 45, 45A, 45B or 45C may be formed in any place except for the formation area F as long as it is located in the marginal area E, which is located outside of the reading area R on a side opposite to the axis of rotation of the document cover 40 when the document cover 40 is in the closed position. Alternatively, a plurality of pressure reducing portions 45, 45A, 45B or 45C may be formed in the marginal area E. For example, the pressure reducing portions may be formed one on each side of the formation area F in the marginal area E.

The illustrative embodiments show, but the disclosure is not limited to, the sheet 44. Instead of the sheet 44, an object thicker than the sheet, e.g., a plate, may be used.

While the features herein have been described in connection with various example structures and illustrative aspects, it will be understood by those skilled in the art that other variations and modifications of the structures and aspects described above may be made without departing from the scope of the disclosure described herein. Other structures and aspects will be apparent to those skilled in the art from a consideration of the specification or practice of the features disclosed herein. It is intended that the specification and the described examples only are illustrative with the scope of the inventions being defined by the following claims.

What is claimed is:

1. An image reading apparatus comprising:
   a document table having a reading area, the document table having a top surface on which a document is to be placed;
   an image reader disposed under the document table, the image reader being configured to read an image of the document placed in the reading area of the document table; and
   a document cover configured to pivot around an axis extending in a first direction relative to the document table between a closed position where the top surface of the document table is covered and an open position where the top surface of the document table is exposed, the document cover including a document table contacting member, the document table contacting member being configured to have face-to-face contact with the top surface of the document table at least in the reading area when the document cover is in the closed position,
   wherein the top surface of the document table has a marginal area which is located outside of the reading area on a side opposite to a side where the document cover pivots around the axis,
   wherein the marginal area of the top surface of the document table includes a first contact area, a second contact area and a non-contact area,
   wherein, when the document cover is in the closed position, the document table contacting member of the document cover contacts the top surface of the document table in the first contact area and the second contact area and does not contact the top surface of the document table in the non-contact area,
   wherein the non-contact area is disposed between the first contact area and the second contact area such that the first contact area, the non-contact area, and the second contact area are arranged in the first direction,
   wherein the document cover further includes a handle portion disposed on the side opposite to the side where the document cover pivots around the axis and the handle portion extends in the first direction, and
   wherein, when the document cover is in the closed position, the non-contact area disposed between the first contact area and the second contact area is located in an area corresponding to a length of the handle portion in the first direction.

2. The image reading apparatus according to claim 1, wherein the document cover contacting member has a cutout corresponding to the non-contact area.

3. The image reading apparatus according to claim 2, wherein the document cover contacting member further includes a further cutout that is symmetrically opposite to the cutout corresponding to the non-contact area with respect to a center of the document cover contacting member.

4. The image reading apparatus according to claim 1, wherein the document cover contacting member has an upward recess corresponding to the non-contact area.

5. The image reading apparatus according to claim 1, wherein the document cover further includes a cushion disposed facing the document cover contacting member on an opposite side of the top surface of the document table when the document cover is in the closed position.

6. An image reading apparatus comprising:
   a document table having a reading area, the document table having a top surface on which a document is to be placed;
   an image reader disposed under the document table, the image reader being configured to read an image of the document placed in the reading area of the document table; and
   a document cover configured to pivot around an axis extending in a first direction relative to the document table between a closed position where the top surface of the document table is covered and an open position where the top surface of the document table is exposed, the document cover including a document table contacting member, the document table contacting member being configured to have face-to-face contact with the top surface of the document table at least in the reading area when the document cover is in the closed position, wherein the top surface of the document table has a marginal area which is located outside of the reading area on a side opposite to a side where the document cover pivots around the axis, wherein the marginal area of the top surface of the document table includes a first contact area, a second contact area and a non-contact area, wherein, when the document cover is in the closed position, the document table contacting member of the document cover contacts the top surface of the document table in the first contact area and the second contact area and does not contact the top surface of the document table in the non-contact area, wherein the non-contact area is disposed between the first contact area and the second contact area such that the first contact area, the non-contact area, and the second contact area are arranged in the first direction, and wherein the non-contact area disposed between the first contact area and the second contact area is located in a central portion of the marginal area in the first direction.

7. The image reading apparatus according to claim 6, wherein the document cover further includes a handle portion disposed on the side opposite to the side where the document cover pivots around the axis and the handle portion extends in the first direction, and wherein, when the document cover is in the closed position, the non-contact area disposed between the first contact area and the second contact area is located in the central portion of the marginal area corresponding to a length of the handle portion in the first direction.

8. The image reading apparatus according to claim 6, wherein the document cover contacting member has a cutout corresponding to the non-contact area.

9. The image reading apparatus according to claim 8, wherein the document cover contacting member further includes a further cutout that is symmetrically opposite to the cutout corresponding to the non-contact area with respect to a center of the document cover contacting member.

10. The image reading apparatus according to claim 6, wherein the document cover contacting member has an upward recess corresponding to the non-contact area.

11. The image reading apparatus according to claim 6, wherein the document cover further includes a cushion disposed facing the document cover contacting member on an opposite side of the top surface of the document table when the document cover is in the closed position.

12. An image reading apparatus comprising:
a document table having a reading area, the document table having a top surface on which a document is to be placed;
an image reader disposed under the document table, the image reader being configured to read an image of the document placed in the reading area of the document table; and
a document cover configured to pivot around an axis extending in a first direction relative to the document table between a closed position where the top surface of the document table is covered and an open position where the top surface of the document table is exposed, the document cover including a document table contacting member, the document table contacting member being configured to have face-to-face contact with the top surface of the document table at least in the reading area when the document cover is in the closed position, wherein the top surface of the document table has a marginal area which is located outside of the reading area on a side opposite to a side where the document cover pivots around the axis, wherein the marginal area of the top surface of the document table includes a first contact area, a second contact area and a non-contact area, wherein, when the document cover is in the closed position, the document table contacting member of the document cover contacts the top surface of the document table in the first contact area and the second contact area and does not contact the top surface of the document table in the non-contact area, wherein the non-contact area is disposed between the first contact area and the second contact area such that the first contact area, the non-contact area, and the second contact area are arranged in the first direction, wherein, when the document cover is in the closed position, the document table contacting member of the document cover has an edge extending in the first direction and overlapping the marginal area and the edge of the document table contacting member of the document cover includes first and second edge portions and a recessed portion disposed between the first and second edge portions in the first direction and being recessed relative to the first and second edge portions, wherein, when the document cover is in the closed position, the first contact area and the second contact area are disposed along the edge of the document table contacting member of the document cover, and wherein, when the document cover is in the closed position, the non-contact area disposed between the first contact area and the second contact area is disposed in the recessed portion of the edge.

13. The image reading apparatus according to claim 12, wherein, when the document cover is in the closed position, the non-contact area disposed between the first contact area and the second contact area is located in a central portion of the edge in the first direction.

14. The image reading apparatus according to claim 12, wherein the document cover further includes a handle portion disposed on the side opposite to the side where the document cover pivots around the axis and the handle portion extends in the first direction, and wherein, when the document cover is in the closed position, the non-contact area disposed between the first contact area and the second contact area is located in a central portion of the edge overlapping a length of the handle portion in the first direction.

15. The image reading apparatus according to claim 12, wherein the document cover contacting member has a cutout corresponding to the non-contact area when the document cover is in the closed position.

16. The image reading apparatus according to claim 15, wherein the document cover contacting member further includes a further cutout that is symmetrically opposite to the cutout corresponding to the non-contact area with respect to a center of the document cover contacting member.

17. The image reading apparatus according to claim 12, wherein the document cover contacting member has an upward recess corresponding to the non-contact area.

18. The image reading apparatus according to claim 12, wherein the document cover further includes a cushion disposed facing the document cover contacting member on an opposite side of the top surface of the document table when the document cover is in the closed position.

* * * * *